United States Patent

Collins et al.

[15] 3,659,271

[45] Apr. 25, 1972

[54] MULTICHANNEL COMMUNICATION SYSTEM

[72] Inventors: Arthur A. Collins, Richardson; John D. Hill, III, Dallas, both of Tex.; Laurence D. Hungerford, Cedar Rapids, Iowa

[73] Assignee: Collins Radio Company, Dallas, Tex.

[22] Filed: Oct. 16, 1970

[21] Appl. No.: 81,217

[52] U.S. Cl. ........................340/172.5, 179/15 AL, 179/18 J

[51] Int. Cl. ........................................G06f 3/04, H04l 5/00

[58] Field of Search....................340/172.5; 179/15 AL, 18 J

[56] References Cited

UNITED STATES PATENTS

| | | | |
|---|---|---|---|
| 3,544,976 | 12/1970 | Collins | 340/172.5 |
| 3,351,917 | 11/1967 | Shimabukuro | 340/172.5 |
| 3,456,242 | 7/1969 | Lubkin | 179/15 AL |

*Primary Examiner*—Paul J. Henon
*Assistant Examiner*—Ronald F. Chapuran
*Attorney*—Henry K. Woodward and Robert J. Crawford

[57] ABSTRACT

Method of communicating in a multichannel communication system especially useful with high speed and low speed devices included in the system. One or more channels or subchannels are provided and controlled for addressing devices and transmitting commands, other channels and subchannels are assigned for the transmission of volumes of data. A poll-bid-grant routine is employed in facilitating the address and command channels, and queuing means is provided in assigning the working channels.

4 Claims, 11 Drawing Figures

INVENTORS.
ARTHUR A. COLLINS
JOHN D. HILL
LAURENCE D. HUNGERFORD
BY H. K. Woodward
ATTORNEY INVENTORS.
ARTHUR A. COLLINS
JOHN D. HILL
LAURENCE D. HUNGERFORD
BY H. K. Woodward
ATTORNEY

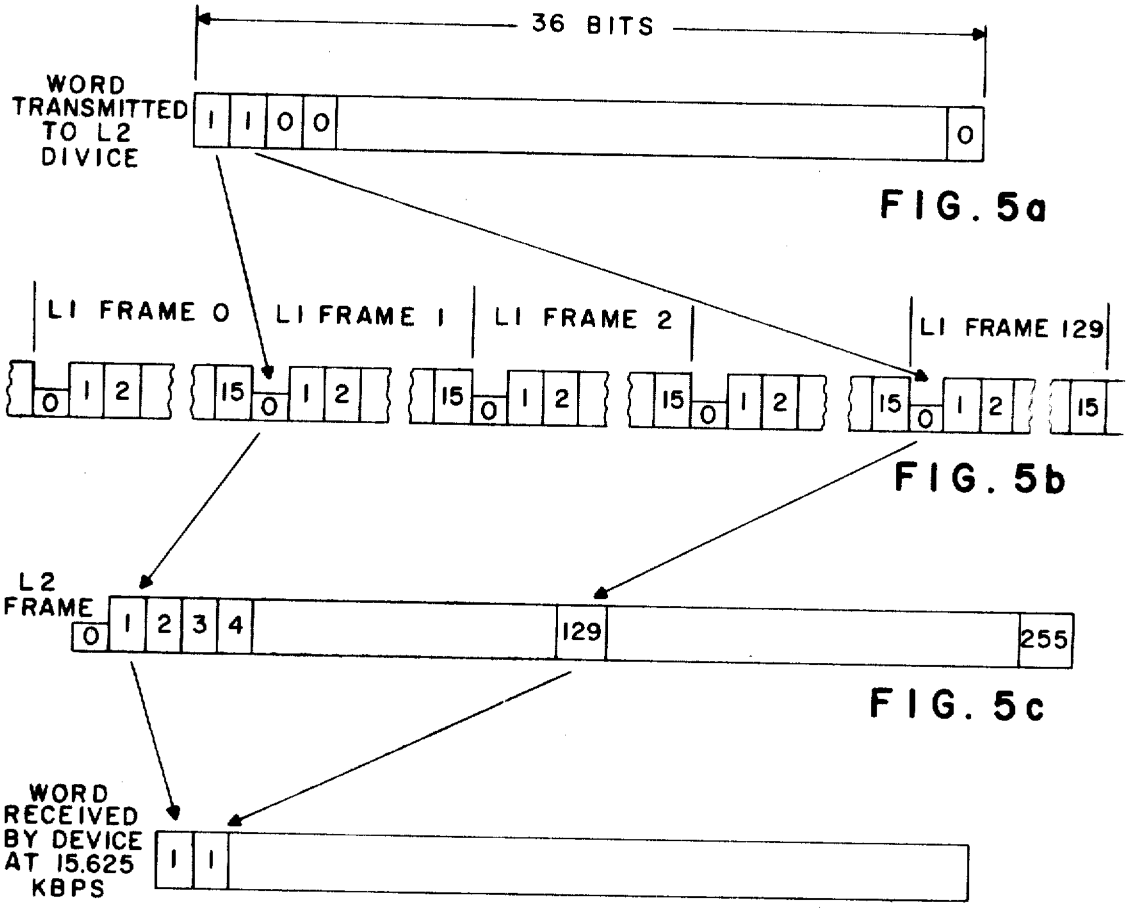
FIG. 5a FIG. 5b FIG. 5c
FIG. 5d
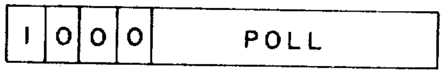
FIG. 6a
FIG. 6b
FIG. 6c
INVENTORS
ARTHUR A. COLLINS
JOHN D. HILL
LAURENCE D. HUNGERFORD
BY H. K. Woodward
ATTORNEY

MULTICHANNEL COMMUNICATION SYSTEM

This invention relates to communication networks, and more particularly to a method of communicating and transferring data in a multichannel communication system. The invention has particular application in a multiprocessor computer system and will be described with respect thereto. However, the invention is not limited to this environment.

Modern enterprise must organize its work in an efficient and orderly manner to insure that all objectives are reached in timely fashion, and that resources are utilized to the maximum. To this end, the computer has become an essential tool to business management.

However, most present day computers are not well suited to aid management directly in the control of directed action networks. Applications are separately defined and implemented and are run independently. Interconnection between applications is performed manually, and parallel execution of interrelated jobs is often impractical. In such computers it is necessary to limit activity separation to relatively grossly defined tasks, because of these and other limitations of existing computers and software.

Further, the quantity of work to be done often exceeds the capacity of a single computer, and each organizational and geographical unit of an enterprise requires its own computer which is dedicated to the fulfillment of its assigned roll. Frequently, work is also separated by class such as scientific, accounting, and direct digital control. This duplication of computing power by function and by geographic location, introduces many problems in communication and central management control, as well as being inefficient in computer utilization.

Heretofore, plural processor computing systems have been proposed, such as the digital computer employing plural processors disclosed in U.S. Pat. No. 3,348,210. This computer has the capacity for performing simultaneous operations, and is described as having particular applicability in completing telephone connections in a central telephone office. This function entails performing a plurality of recurring routines, with each processing unit having independent access to system storage means and peripheral equipments. To prevent concurrent access to the same memory location, for example, the processors are provided with randomly synchronized clocks. Outside of the telephone environment, however, such a system presents problems of control and system communication. Further, such a system is limited in application as processor units do not communicate or interface with one another.

Collins Radio Company, assignee of the present invention, has introduced a revolutionary new computer system which overcomes many of the limitations and difficulties of conventional computer systems. Designated the C-system, the Collins computer network includes a plurality of processors and a switched communication network which interconnects the processors and all equipment in a closed, multiplexed data loop thereby giving all processors full access to the total data storage facility of the system including all attached disc files and associated libraries.

The present invention entails the method and means for communicating in a multichannel communication system, and particularly to a method of communication between processors and other high speed devices, and between these high speed devices and slower speed devices in a computer system whereby maximum utilization is made of all devices and wherein system control is maintained while allowing total system availability in carrying out concurrently a plurality of diverse operations. Further, the invention has broader application in any multichannel communication system.

Accordingly, an object of the invention is an improved communication arrangement in a multichannel communication system.

Another object of the invention is a method and means for communicating in multiprocessor computer system.

Another object of the invention is a method of communicating between high speed devices and low speed devices in a multiprocessor communication, computation, and control system which allows maximum utilization of all equipments.

Still another object of the invention is a method of communicating in a multiprocessor network which allows flexible employment of system equipments.

Briefly, in accordance with the present invention all processors, disc files, and other high speed devices of a computer system are tied together by high speed communication facility in the form of a closed time division exchange (TDX) loop through which a serial stream of bit multiplexed data is transmitted. The multiplexed bit stream defines a plurality of channels and subchannels. One of the channels is dedicated to a second closed TDX loop to which is connected lower speed equipments, such as modems, cathode-ray tubes, printers, teletype, and like input/output devices. This dedicated channel flows through both TDX loops while the other channels flow only through the high speed TDX loop. In like manner, one or more additional channels may be dedicated to other auxiliary TDX loops, as required. Physically the two TDX loops may comprise a single coaxial or like communication line, but electrically the two loops operate at significantly different speeds through the employment of multiplex techniques.

Within the first, high speed loop, one channel, or subchannel, is dedicated to transferring short service messages or commands between processors, while certain other channels may be dedicated to disc files or otherwise available for the transmission of larger volumes of data.

Similarly, within the second lower speed TDX loop, one subchannel bit stream is devoted to communicating service messages, or instructions, between processors of the first TDX loop and the peripheral devices tied to the second TDX loop, with all other subchannels being available for transmission of data to and from the peripheral devices on a temporarily assigned basis. Each peripheral device has its own address, and each such device may receive instructions or service messages over the communication subchannel while the flow of data occurs over one of the other data subchannels.

Preferably, several data channels in the first TDX loop are dedicated to respective disc files while in the second TDX loop none of the devices has a dedicated channel of fixed address. Any device on a second loop can communicate with any processor over a designated subchannel which is assigned temporarily for a particular transaction. Thus, all the peripheral devices on the second loop comprise an equipment pool which is available to any processor, thereby obviating delays or limitations attendant with individual processor dedicated devices.

The invention and these and other objects and features thereof will be apparent from the following detailed description and appended claims when taken with the drawings, in which:

FIGS. *5a–5d* represent the method of transmitting service messages and data between devices in accordance with the present invention; and FIGS. *6a–6c* are representative formats of data words used in accordance with the present invention.

Figure 1:
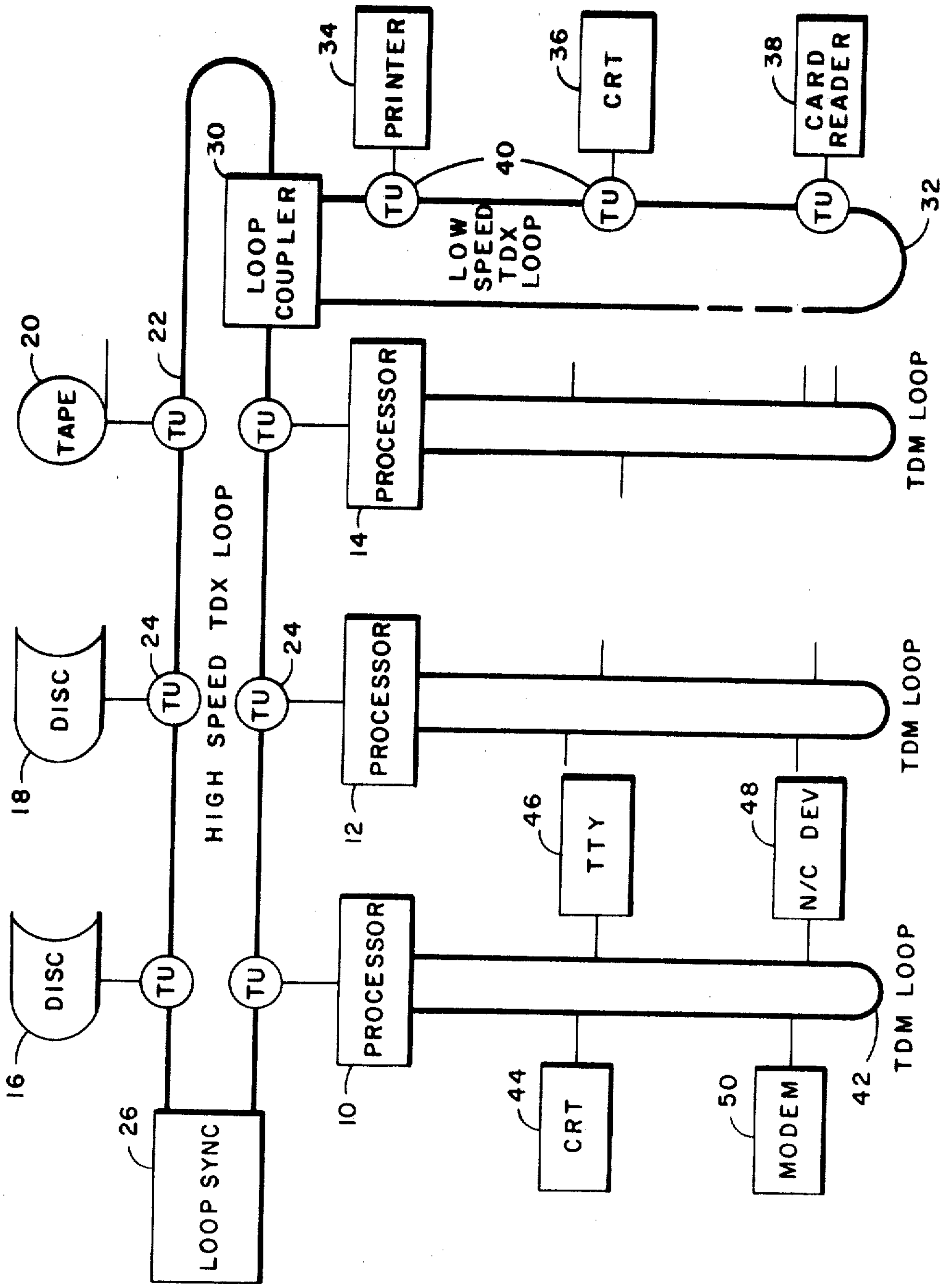
FIG. 1 is a functional block diagram of a multiprocessor computer system in which the present invention is applicable.

Referring now to the drawings, FIG. 1 is a functional block diagram of a multiprocessor computer system and a switched communication network which interconnects the processors and all equipment in a closed multiplex data loop and in which the present invention is particularly applicable. This multiprocessor computer system is disclosed in detail in co-pending application Ser. No. 74,783 filed Sept. 23, 1970, and various portions thereof are disclosed in other co-pending applications to be referenced below. Generally, the system comprises a plurality of processors 10, 12, and 14, and a plurality of storage units such as discs 16 and 18 and tape 20, which are connected to a high speed, time division exchange (TDX) loop 22 by means of suitable terminal units 24. Loop 22, which carries a plurality of bit multiplexed channels, is driven by a loop synchronizer 26.

In one specific embodiment, to be described further below, the loop synchronizer 26 generates a digital pulse train at 32 mbps. This pulse train is used to derive 16 2 mbps bit interlaced communication channels (every 16th bit being devoted to one channel). The terminal units 24 identify the channels by detection of a synchronization pulse generated by the loop synchronizer and couple their respective devices to these channels. A detailed description of the loop synchronizer may be found in co-pending application Ser. No. 61,559 filed Aug. 6, 1970, and the terminal units are described in detail in co-pending application Ser. No. 74,670 filed Sept. 23, 1970, both applications being assigned to the present assignee.

Tied to the high speed time division exchange loop 22 by means of a loop coupler 30 is a second, lower speed time division exchange loop 32 to which are connected a plurality of input/output devices such as printer 34, cathode-ray tube 36, and card reader 38. In like manner as the high speed loop 22, each of the input devices is tied to the lower speed TDX loop 32 by means of terminal units 40. Again, it is to be appreciated that use of an auxiliary physical loop and loop coupler represents but one environment in which the present invention is applicable. A single physical line with electrically defined loops may also employ the invention herein defined.

The function of loop coupler 30 is to extract one channel from the high speed time division exchange loop 22, said one channel being dedicated to the lower speed time division exchange loop 32, and provide subchannels within the one channel for communication with the various devices connected to loop 32. The loop coupler is further described in co-pending application Ser. No. 74,669 filed Sept. 23, 1970, also assigned to the present assignee.

One or more additional lower speed time division exchange loops, similar to loop 32 also may be provided in the system to connect additional lower speed devices. The function of loop 32 is to provide a pool of lower speed input/output devices all of which are available for use by the processors 10, 12, and 14 on the high speed time division exchange loop 22, through use of the communication method described hereinbelow. Further, while a loop coupler is used to couple a physically separate loop to the first loop, as described above the two loops may physically comprise a single coaxial or like communication line, with the two loops electrically defined by their respective operating frequencies.

Additionally, each process on the high speed time division exchange loop 22 may have a time division multiplex loop 42 to which is connected a plurality of low speed devices such as cathode-ray tube 44, teletype 46, numerically-controlled device 48, and a modem 50. The numerically-controlled device 48, for example, may be one of a number of automatically controlled machines and systems within a factory. Modem 50 is utilized to connect TDM loop 42 to a remote center. Communication with the devices connected to loop 42 is controlled solely by processor 10 and is not part of the present invention. A further description of the TDM loop 42 may be found in co-pending application Ser. No. 054,973, filed June 20, 1969, now U.S. Pat. No. 3,544,976 assigned to the present assignee.

The described multiprocessor computer system is designed to allow maximum utilization of all devices in carrying out concurrently a plurality of independent directed action operations. Advantageously, a program control mode of system operation, in accordance with co-pending application Ser No. 74,723 filed Sept. 23, 1970, may be implemented which allows maximum utilization of the various system devices in managing and completing these directed action programs concurrently.

Figure 2:
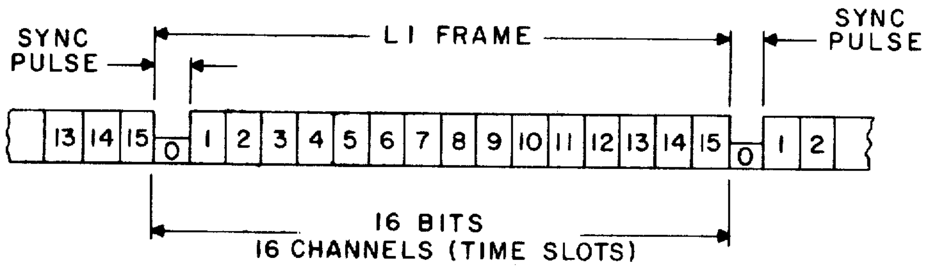
FIG. 2 is a format of a serial bit-multiplexed pulse train in the system of FIG. 1.

In accordance with the present invention a communication arrangement in the multiprocessor computer system allows communication between the high speed devices and the low speed devices to achieve flexible and efficient employment of the system equipments. Referring to FIG. 2, the bit frame for the high speed time division exchange loop 22 includes 16 bits which define 16 channels or time slots. In this specific example, loop synchronizer 26 generates a 32 mbps bit stream which enables 16 channels to operate at 2 mbps each. It will be appreciated that the speed of the high speed time division exchange loop 22 may be increased to 512 mbps, for example, and have 256 channels each operating at 2 mbps. Since only one channel is required for a processor to communicate with another device, the specific example illustrated in FIG. 2 enables 16 communications to be handled concurrently.

Figure 3:
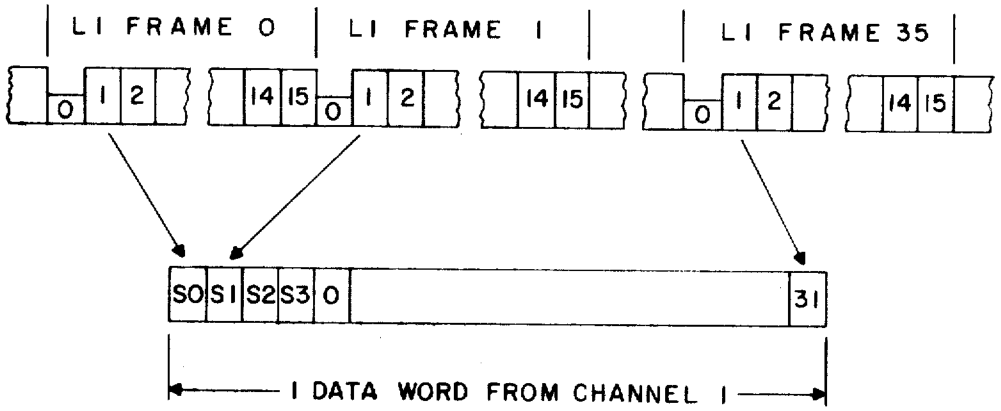
FIG. 3 is a format of a data word in the pulse train of FIG. 2.

As shown in FIG. 3, 36 frames are utilized to derive one data word for each of the channels. For example, the 36 bits for a data word in channel one are derived from bit one in each of the frames. It is noted that 32 information bits of a word are preceded by four supervisory bits identified as S0 through S3. The four supervisory bits are used to acquire a channel and to specify that the channel is busy. These supervisory bits also identify the request for data and the movement of data as well as the termination of a transaction and request for status.

Figure 4:
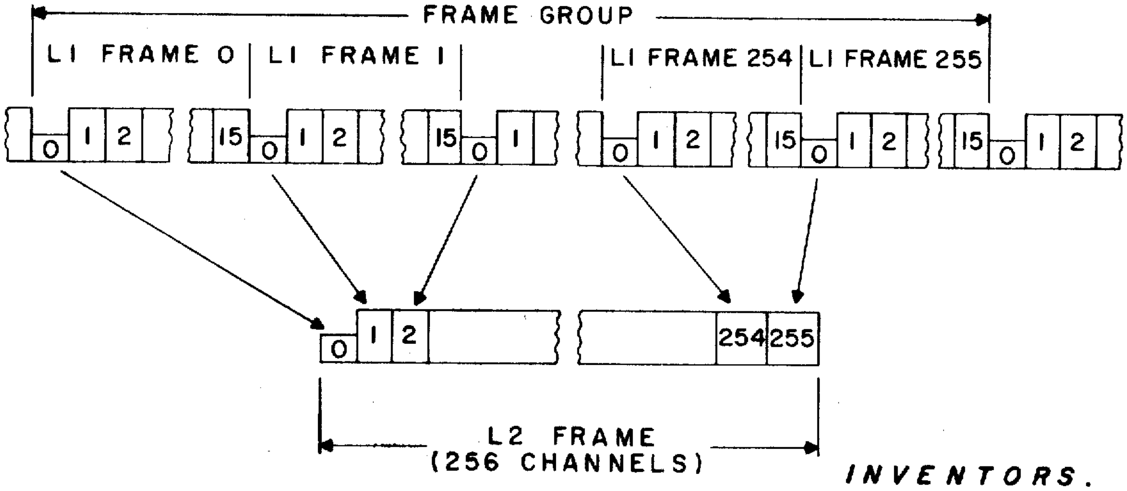
FIG. 4 is another format of a data word in the pulse train of FIG. 2.

As above noted, one channel of the bit stream generated by loop synchronizer 26 is dedicated to the lower speed time division exchange loop 32. As shown in FIG. 4, bits from a plurality of frames generated by the loop synchronizer form one frame in the loop 32 data stream; in this particular embodiment bits from 256 frames generated by the loop synchronizer comprise the lower speed TDX loop frame. Loop coupler 30 is designed to recognize and extract the particular bit from each frame (in this case bit 0) and provide the extracted bit to the lower speed time division exchange loop 32.

The 256 bits which comprise the frame in the lower speed TDX loop 32 may each define a subchannel in this loop, or by strapping bits together higher speed subchannels may be created. For example, two bits from each frame may be strapped to form a subchannel having a data transfer rate of 15.625 thousand bits per sound, on the basis of a 32 mbps bit stream from the loop synchronizer. As shown in FIG. 5, a 36 bit word (FIG. 5*a*) to be transmitted to a device on loop 32 is multiplexed into the loop 32 channel defined by the zero bit in each loop 22 frame (FIG. 5*b*), and more specifically the bits are multiplexed into the loop 32 channel as bit positions 1 and 129 in the loop 32 frame (FIG. 5*c*). That is, bit one and bit 129 in each loop 32 frame are strapped to define one subchannel in the loop 32 channel. The word is received by the appropriate device on loop 32 by the device terminal unit extracting the bits within the specified subchannel (FIG. 5*d*).

To facilitate communication between devices including all high speed devices on loop 22 and all low speed devices on loop 32, while the concurrent transfer of data between certain devices in occurring, one subchannel in loop 22 is limited to service messages or commands between high speed devices connected to loop 22. All other channels and subchannels on loop 22 are reserved for transferring the large volumes of data. Accordingly, the service messages which are communicated over the dedicated communication channel are simple and may consist of only six words each. These service messages are sent from one processor to another and indicate the location of desired data and instructions as to the use of the data. Since all large volumes of data are transferred to or from storage devices on loop 22, each of these storage devices preferably has its own dedicated channel. Thus, communications between processors in the form of service messages are transmitted over the communication channel, whereas all transactions involving stored data are transmitted over the channels which are dedicated to individual memory devices or over other assignable data channels.

All processor terminal units are designed to monitor the communication channel in loop 22. Thus, the communication channel may be regarded as a party line connection whereby only two processors may communicate with each other at one time. Each processor has a party line address and is called through addressing before communication is established.

Because of the limited capacity required of the communication channel, the communication channel preferably is carved out of the channel dedicated to the slower speed time division exchange loop 32. That is, if the loop 32 channel is derived from channel 0 in the loop 22 frame, every 16th channel 0 bit may be used to implement the high speed loop 22 communication channel. Thus, the lower speed loop 32 channel loses 1/16 of its capacity as every 16th bit is retained by loop 22 for communication purposes.

Similarly, a second communication channel is established in the lower speed loop 32 communication line to permit the transfer of service messages between processors on loop 22 and the peripheral devices on loop 32. This second communication channel comprises a subchannel in loop 32. For example, due to speed limitations of the peripheral devices, only one of the 256 channels in a loop 32 frame may be needed for this second communication channel.

Accordingly, of the 256 subchannels within the loop 32 channel, 16 subchannels are extracted to comprise the first communication channel for the high speed time division exchange loop 22, and one subchannel is dedicated to the second communication channel for the low speed TDX loop 32. Therefore, 239 subchannels remain in each loop 32 frame for data transfer between the low speed peripheral devices on loop 32 and the storage devices on loop 22 on a temporary assignment basis.

Control of the two communication channels is assigned to one or more processors and their respective terminal units on loop 22. A poll-bid-grant sequence is utilized in assigning the channels to devices on the two loops.

Using the 36 bit word format described above, the controlling terminal unit periodically transmits a poll word over the communication channel advising the devices that the channel is open. FIG. 6a shows one example of a pool word in which the first supervisory bit is a "1" and the other three supervisory bits are "0".

Devices on the loop which utilize the communication channel continually monitor the channel. When communication with another device is required, either processor to processor or processor to peripheral device, the calling device will bid for the channel by detecting the poll word and changing the second supervisory bit to a "1", as shown in FIG. 6b. The controlling terminal unit grants the channel to the calling device by repeating the bid word as received, and the calling device terminal unit recognizes the return of its bid as channel granted and proceeds to use the channel.

When the communication channel is a shared party line, as in the slower speed TDX loop 32, then the party line address of the called device is included in the first word transmitted by the calling device. As seen in FIG. 6c, the data transfer format includes "1" bits in the four supervisory positions, and the first word format will include in the data portion a party line address consisting of the first eight bits, a device command word as the next eight bits, the loop 22 channel address (if appropriate) as the next eight bits, and the last eight bits are the loop 32 channel address (if appropriate).

If the called device recognizes its party line address, acknowledgement is transmitted back to the calling device and the called device remains ready to receive a command message. Should the calling device fail to receive an acknowledgement, either because the called device is busy or merely fails to detect its address, then the calling device releases the channel, and the poll-bid-grant cycle must be repeated later to again acquire the communication channel.

Assuming the called device acknowledges its address, the calling device, if a processor, generates a service message as required by a service program of application program being run within the processor, as further described in co-pending application Ser. No. 74,723, supra. The service message identified the program or function which originated the service message, the program which is to receive the data generated as a result of the action taken, the time division address of the device containing the affected data, and the location of the data within the device. Thus, for example, if the device containing affected data is a disc file on the loop 22, the address of this device and the location of the data within the device will be given. Thereafter, the called device transmits data to the disc file or extracts data from the disc file, over an assigned working channel, as commanded.

After the calling device has completed the command data transfer via the communication channel, the calling device transmits a disconnect word to the called device which has the same format as a poll word. This disconnect word is repeated by the called device and returned to the calling device. Thereupon, the called device disconnects, and upon receipt of the repeated word the calling device disconnects.

The transfer of commands over the communication channel initiates a device acquisition and control service function which is resident in one processor of the system and which controls the allocation of the working channels. This control service function is instructed to provide a data transfer channel to the called device, and if such a channel is not immediately available, the instruction is entered in a channel assignment queue. This queue is subsequently serviced by the device acquisition and control service which then initiates the transmission of an assigned working channel service message to the called device. Upon receipt of this channel assignment message, the called device monitors the assigned channel, waits for a call from the user program, and then commences transfer of data over the assigned channel.

When a peripheral device initiates the input/output request, such as a tape file read-in, this unsolicited request is transmitted by the communication channel bid message input through the device acquisition and control service of the controlling processor. The device acquisition and control service then assigns a working channel in the loop to the device including a temporary channel address for the device so long as the working channel is used by the device.

The transfer of data between the lower speed peripheral device and the higher speed disc, for example, is accomplished over the assigned working channel through the controlling processor, and then over the assigned disc channel in compatible speed and format.

In a multiprocessor system including a high speed loop and at least one lower speed loop with multiplex channels for effecting directed action networks within the system, as above described, maximum utilization of all equipments has been achieved by providing high speed and low speed communication channels for sending and receiving commands while the other channels are reserved for large volume data transfers. With such an arrangement, the lower speed input/output devices connected to the lower speed TDX loop comprise an equipment pool which is available to any of the processors in the system.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:

1. In a multiprocessor computer system including a first closed communication loop, a second closed communication loop, coupling means coupling said first and second communication loops, a plurality of high speed devices connected to said first communication loop, and a plurality of lower speed devices on said second loop, the method of communicating and transferring data between said devices comprising the steps of a. generating a serial bit data stream in said first loop, b. defining a plurality of multiplexed channels in said serial bit data stream, c. dedicating at least one of said channels to said second loop, d. defining within said at least one channel a plurality of subchannels, e. transferring instruction messages between devices on one of said subchannels, and f. transferring data to and from storage devices on other subchannels.

2. The method defined by claim 1 wherein said plurality of high speed devices include at least two processors and further including the step of transferring instruction messages between said processors on a second of said subchannels.

3. The method defined in claim 2 wherein one of said processors controls the first subchannel and including the step of periodically polling said devices on said second loop and said processors on said first loop and granting said first subchannel to a device in response to a device bid for said subchannel.

4. The method defined by claim 3 wherein one of said processors controls said second subchannel and including the step of periodically polling said processors on said first loop and granting said second subchannel to a processor in response to a processor bid for said subchannel.

* * * * *